United States Patent [19]

Moorhouse

[11] 3,935,932
[45] Feb. 3, 1976

[54] BRAKE OPERATING SYSTEMS
[75] Inventor: Stephen Moorhouse, Huddersfield, England
[73] Assignee: David Brown Tractors Limited, Meltham, Huddersfield, England
[22] Filed: June 17, 1974
[21] Appl. No.: 480,250

[52] U.S. Cl............ 192/13 R; 74/478.5; 74/480 R; 74/481; 74/526; 188/16
[51] Int. Cl.² .................. F16D 67/02; G05G 9/00
[58] Field of Search............ 192/4 A, 13 R; 74/478, 74/478.5, 480 R, 481, 512, 526; 188/16, 354

[56] References Cited
UNITED STATES PATENTS

| 1,930,710 | 10/1933 | Dodge et al. | 192/13 R |
|---|---|---|---|
| 2,485,759 | 10/1949 | Miller | 74/481 |
| 2,504,729 | 4/1950 | Rajan | 74/481 |
| 3,063,528 | 11/1962 | Wood | 192/13 R |
| 3,262,525 | 7/1966 | Ehlke et al. | 192/13 R |
| 3,267,765 | 8/1966 | Stohler | 74/480 |
| 3,542,173 | 11/1970 | Kratzenberg et al. | 192/13 R X |
| 3,700,043 | 10/1972 | Sullivan | 74/526 X |
| 3,815,697 | 6/1974 | Bridwell et al. | 192/13 R |

Primary Examiner—Allan D. Herrmann
Attorney, Agent, or Firm—Norris & Bateman

[57] ABSTRACT

An agricultural tractor has individually operable near-side and off-side brakes with respective brake levers. Said levers are disposed one at each side of a master lever, the three levers being pivotable about a common axis and each provided with a foot pedal. The master lever carries a pivotally mounted cross-bar arranged to operate both of the brake levers with an equalising action when the master lever is operated. One of the two brake levers is fixed to a transversely extending horizontal shaft journalled in a sleeve which is mounted on the tractor and rotatably supports a clutch-operating lever.

12 Claims, 3 Drawing Figures

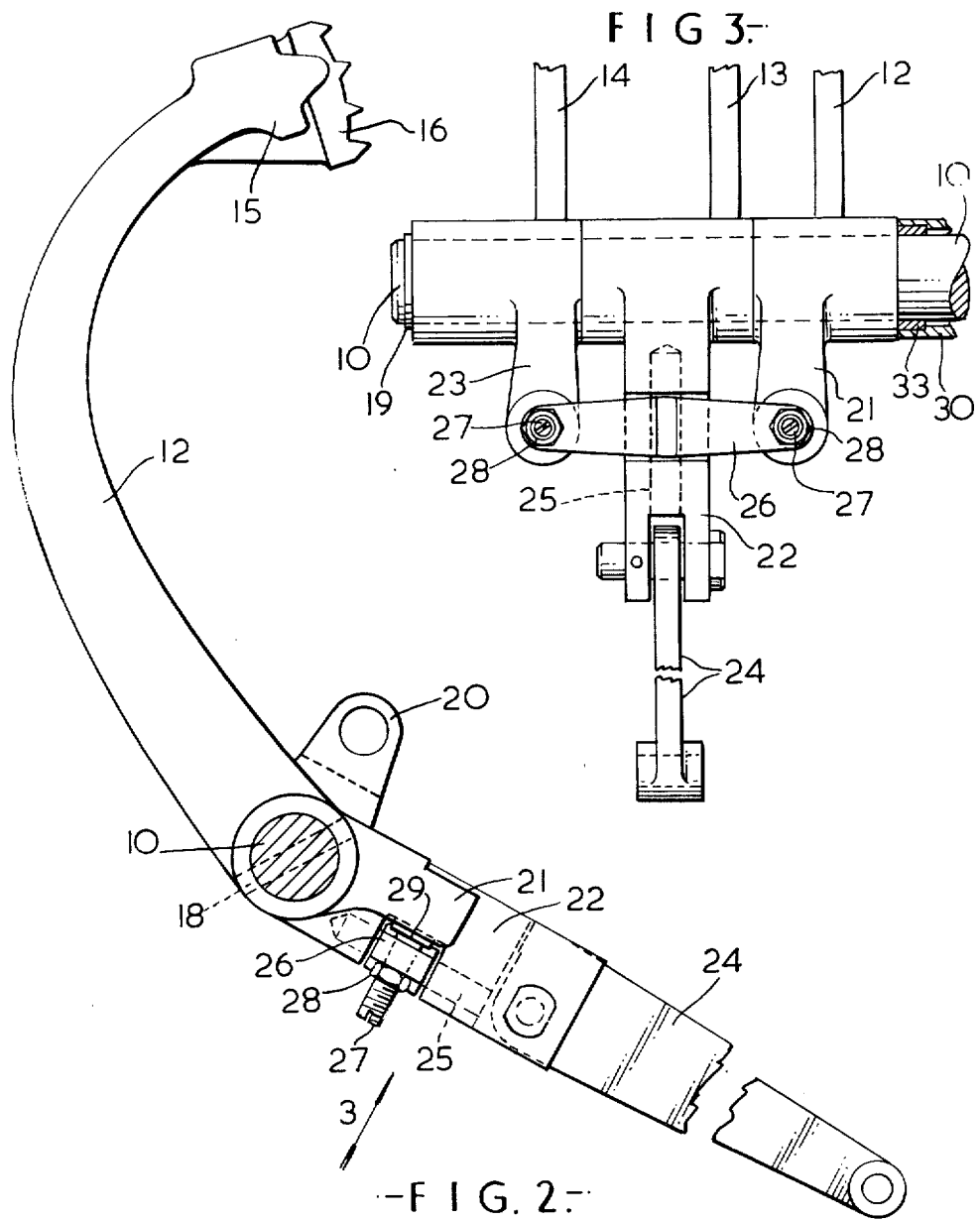

BRAKE OPERATING SYSTEMS

BACKGROUND OF INVENTION

The invention relates to brake operating systems for agricultural tractors and the like.

Such vehicles generally have individually operable near-side and off-side brakes to enable turns of very small radius to be made, and individual near-side and off-side brake pedals are therefore provided. When such a vehicle is driven on the road, it is necessary that both the near-side and the off-side brakes should operate together, each providing an equal share of the braking effort. This is particularly essential where certain types of brakes such as oil-immersed disc brakes are employed, as any tendency for one brake to provide more than its share of the braking effort results in a disproportionate temperature rise and consequential expansion within said one brake which then causes it to provide even more or all of said effort. In order to ensure that the braking effort is shared equally, it is known to provide a master pedal, or a latch for temporarily locking the two brake pedals together. The object of the present invention is to provide an improved brake operating system of the kind including a master pedal.

SUMMARY OF INVENTION

According to the invention, a brake operating system for an agricultural tractor comprises three levers pivotable side-by-side about a common axis and each carrying a foot pedal, one of the two outer levers being arranged to operate the brake on one side of the tractor, the other of the two outer levers being arranged to operate the brake on the other side of the tractor, and the middle lever constituting a master lever carrying a pivotally mounted cross-bar arranged to operate both of the outer levers with an equalising action when the master lever is operated.

BRIEF DESCRIPTION OF DRAWINGS

A preferred embodiment of the invention will now be described, by way of example only, with reference to the accompanying drawings of which:-

FIG. 2 is a side elevation of the brake levers thereof; and

FIG. 3 is a view in the direction of the arrow 3 in FIG. 2.

DESCRIPTION OF PREFERRED EMBODIMENT

Figure 1:
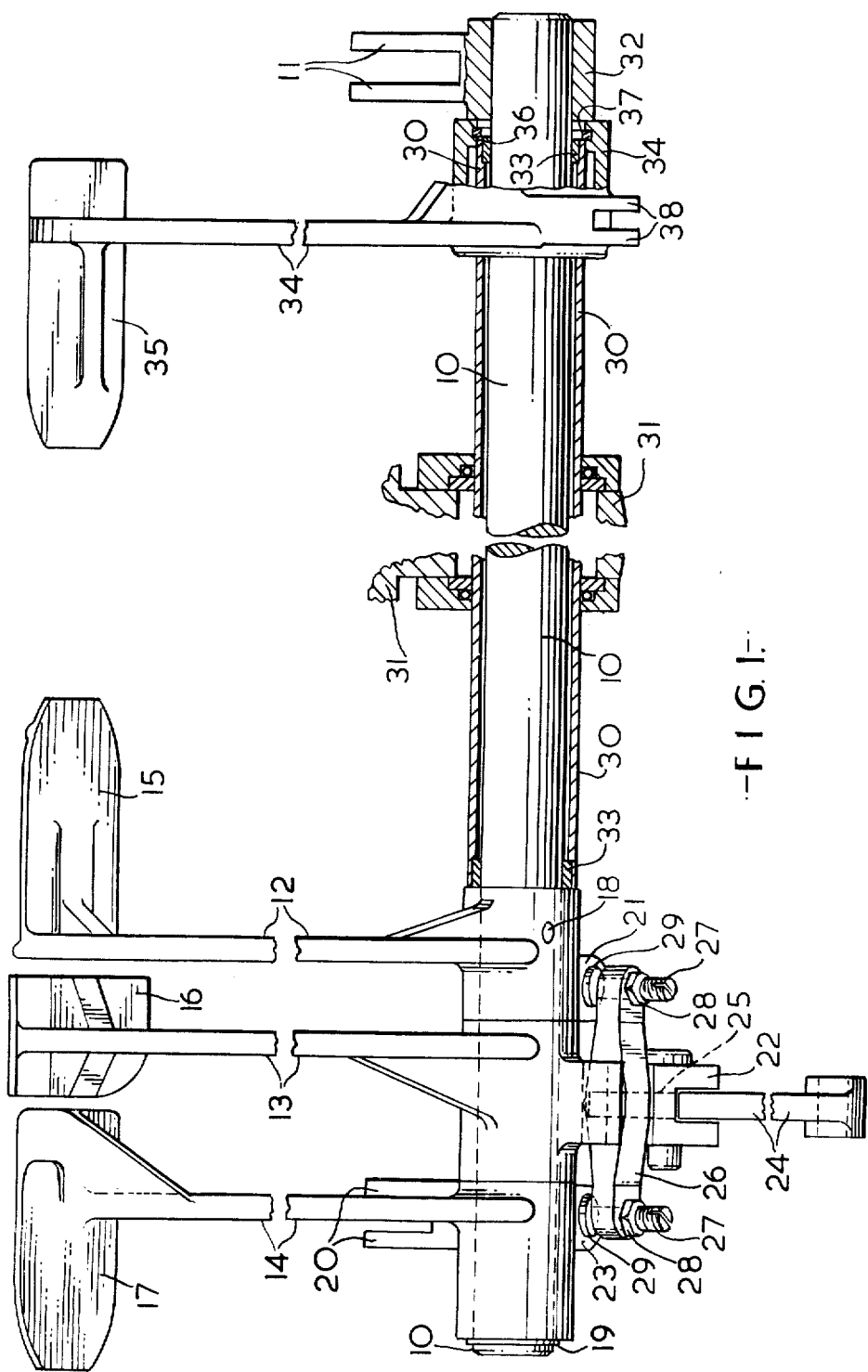
FIG. 1 is a front elevation of the brake and clutch lever assembly of an agricultural tractor.

Referring now to the drawings, an agricultural tractor has conventional individually operable brakes for its near-side rear wheel and its off-side rear wheel respectively. A horizontal shaft 10 extends transversely of the tractor at the front of and approximately at the level of the driver's platform, and at the near side of the tractor said shaft has a pair of lugs 11 which are operatively connected to the near-side brake. The shaft 10 is pivotable about its axis to apply said brake by the near-side one 12 of three levers 12, 13 and 14 mounted side-by-side on the shaft 10 at the off side of the tractor and each carrying one of three foot pedals 15, 16 and 17, said near-side lever 12 being rigidly secured to the shaft 10 by a mills pin 18 and the other two levers 13 and 14 being pivotable on the shaft 10 and retained thereon by a circlip 19. The off-side one 14 of the levers has a pair of lugs 20 which are operatively connected to the off-side brake so as to apply said brake when the off-side lever 14 is pivoted about the axis of the shaft 10. The middle lever 13 constitutes a master lever, and all three levers 12, 13 and 14 have respective portions 21, 22 and 23 which extend on the opposite side of the shaft 10 to the pedals 15, 16 and 17. Said portion 22 of the master lever 13 is operatively connected to a hand brake linkage 24, and carries a pivot pin 25 the axis of which lies in a plane perpendicular to the axis of the shaft 10 and extends parallel, or substantially so, to the adjacent portions 21 and 23 of the near-side and off-side levers 12 and 14. A cross-bar 26 is pivotally mounted on the pivot pin 25 and its ends extend below said portions 21 and 23 of the near-side and off-side levers 12 and 14 respectively. Each end of the cross-bar 26 has a screw-threaded hole in which a screwed stud 27 is adjustably secured by a lock-nut 28, the heads 29 of the studs 27 providing points of contact between the cross-bar 26 and said portions 21 and 23 of the near-side and off-side levers 12 and 14 respectively.

In agricultural tractors it is known to provide a clutch-operating lever carrying a foot pedal pivotable directly upon the transversely-extending horizontal shaft on which the brake-operating levers are mounted. However, we have found that when a master brake-operating lever is provided in the manner set out above, frictional drag between the shaft and the clutch-operating lever interferes with the brake-equalising action. We therefore provide a sleeve 30 mounted in the tractor's frame 31 and co-axially surrounding the shaft 10 between the near-side one 12 of the brake-operating levers and the vicinity of a boss 32 carrying the pair of lugs 11 at the near-side end of the shaft 10. Said shaft is journalled in plain bearings 33 in the sleeve 30. A clutch-operating lever 34 carrying a foot pedal 35 has a bore 36 enabling it to be pivotally mounted on the sleeve 30. The lever 34 projects slightly beyond the near-side end of the sleeve 30 and is retained thereon by abutting against the boss 32, and is prevented from moving along the sleeve 30 away from said boss by an internal circlip 37 which engages in a groove in the bore 36 of said lever and abuts against the near-side end of the sleeve 30. The lever 34 has a pair of lugs 38 which are operatively connected to the tractor's main power transmission clutch.

In operation, in the field, the near-side and off-side brake-operating levers 12 and 14 are operated individually to brake one or the other of the tractor's rear wheels when a turn of very small radius is required at a headland. On the road, however, operation of the master brake-operating lever 13 causes the pivoted cross-bar 26 to operate both of said near-side and off-side brake-operating levers together, with an equalising action which is not affected by the provision of the clutch-operating lever 34 pivotable about the axis of the shaft 10.

In a modification, the three brake-operating levers 12, 13 and 14 do not have portions which extend on the opposite side of the shaft 10 to their pedals 15, 16 and 17, the pivot pin 25 for the cross-bar 26 being disposed between the shaft 10 and the pedal 16 on the master brake-operating lever 13 and the ends of the cross-bar 26 extending above the adjacent parts of the near-side and off-side brake-operating levers 12 and 14 respectively. The master brake-operating lever 13 may, however, retain its portion 22 for the connection thereto of the hand brake linkage 24.

I claim:

1. A clutch and steering brake operating system for an agricultural tractor comprising four levers pivotable about a common axis and each carrying a foot pedal, three of said levers being brake levers disposed side-by-side and the remaining lever being a clutch-operating lever, one of the two outer brake levers being arranged to operate the brake on one side of the tractor, the other of the two outer brake levers being arranged to operate the brake on the other side of the tractor, and the middle brake lever constituting a master brake lever, a pivotally mounted cross-bar on said master brake lever arranged to operate both of said outer levers with an equalising action when the master brake lever is operated, a shaft mounted to rock about said axis and upon which one of said outer levers is rigidly secured and the two other brake levers are pivotally mounted, a sleeve mounted on the tractor and co-axially surrounding said shaft which extends relatively rotatably therethrough, and means pivotally mounting a clutch-operating lever on said sleeve.

2. A brake operating system according to claim 1, wherein the cross-bar is pivotally mounted directly on the master lever.

3. A brake operating system according to claim 1, wherein the cross-bar is pivotally mounted about an axis which lies in a plane perpendicular to the common axis and extends substantially parallel to the adjacent portions of the two outer levers.

4. A brake operating system according to claim 1, wherein the cross-bar is located on the opposite side of the common axis to the pedals.

5. A brake operating system according to claim 1, wherein the cross-bar contacts each of the outer levers by way of an adjustable stud.

6. In the system defined in claim 1, spaced bearing means located respectively adjacent the brake levers and the clutch lever journalling said shaft on said sleeve.

7. A brake operating system according to claim 1, wherein said shaft has a lug adapted to be connected to the brake on one side of the tractor, and the outer lever which is pivotally mounted on said shaft has a lug adapted to be connected to the brake on the other side of the tractor.

8. A brake operating system according to claim 7, wherein the clutch-operating lever is disposed on said one side of the tractor adjacent the lug on the shaft.

9. A brake operating system according to claim 1, wherein the clutch-operating lever has a lug adapted to be connected to the tractor's main power transmission clutch.

10. A brake operating system according to claim 1, wherein a hand brake linkage is connected operatively to the master lever.

11. In an agricultural tractor having a frame, a shaft, a sleeve surrounding a portion of said shaft and mounted on said frame, bearing means journalling said shaft on said sleeve, a group of three side by side independently operable brake levers mounted on a portion of said shaft not surrounded by said sleeve, one of the outer of said levers being fixed to the shaft and the other two being rotatably mounted on said shaft, a cross bar intermediately pivoted on the middle one of said levers and extending to operate the other two levers with a substantially equalising action when the middle lever is actuated, and a clutch operating lever pivotally mounted on said sleeve.

12. In the tractor defined in claim 11, means for connecting the other of said outer brake actuating levers to the brake at one side of the tractor and means connecting said shaft directly to the brake at the other side of said tractor.

* * * * *